Figures 1, 2:
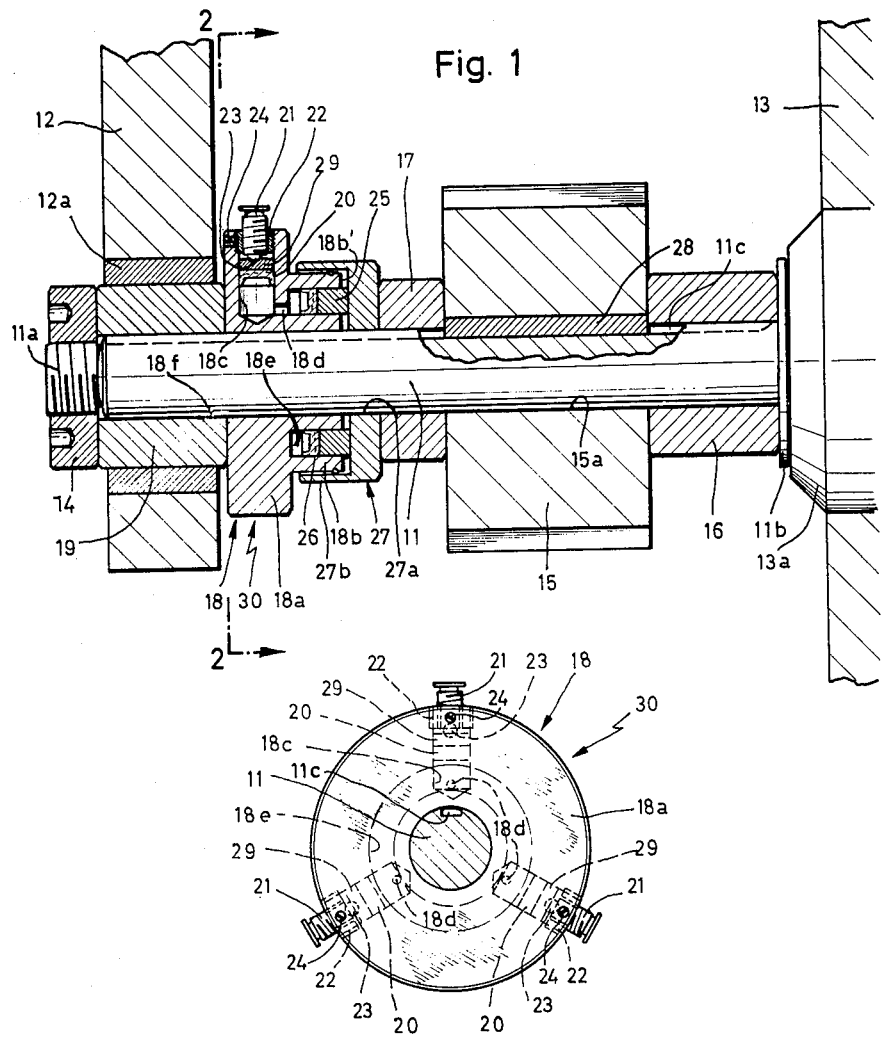

March 29, 1966 M. KASTLER 3,242,818
EXPANSIBLE ADAPTER
Filed Feb. 10, 1964

Inventor:
Michael Kastler
by Michael J. Striker 3,242,818
EXPANSIBLE ADAPTER
Michael Kastler, Am Kreuzstein 20,
Giengen (Brenz), Germany
Filed Feb. 10, 1964, Ser. No. 343,864
Claims priority, application Germany, Feb. 12, 1963,
Sch 32,765
13 Claims. (Cl. 90—11)

The present invention relates to adapters in general, and more particularly to an expansible adapter which is particularly suited to serve as a means for eliminating axial play of ring-shaped components which are treaded on a mandrel, shaft, spindle, bar or a similar rod like carrier.

It is an important object of my invention to provide a very simple, compact, readily adjustable and very accurate expansible adapter which may be put to use in many types of power-driven or manually operated tools and which need not be positively connected with its carrier.

Another object of the invention is to provide a hydraulically operated expansible adapter which is particularly suited to serve as a means for eliminating axial play of ring-shaped components on the arbor of a milling cutter or a similar rotary tool.

A further object of the invention is to provide an expansible adapter of the above outlined characteristics which may be expanded or contracted by exertion of a very small force and with the help of readily available tools, which may be adjusted with little loss in time and without necessitating partial or complete dismantling of the machine even if it happens to be mounted in a hard-to-reach section of the machine, and which is constructed and assembled in such a way that at least some of its parts may be mounted on carriers of different diameters.

A concomitant object of the invention is to provide an expansible adapter which may be manufactured at low cost and which, despite its comparatively small size, will be capable of transmitting substantial axial forces to invariably eliminate any undesirable axial play in machine tools or similar types of machines which are utilized in finishing of racks, pinions, gears and analogous products with utmost precision.

Still another object of the invention is to provide a hydraulically operated expansible adapter which need not contain large quantities of hydraulic fluid and wherein the supply of such fluid may be renewed as often as desired and with little loss in time.

With the above objects in view, one feature of my invention resides in the provision of an expansible adapter, particularly for eliminating axial play of one or more ring-shaped components on a shaft, arbor or similar rod like carrier. The adapter comprises an annular cylinder member adapted to be treaded on the rod like carrier and having an end face provided with a chamber arranged to accommodate a supply of hydraulic fluid and communicating with at least one preferably radially extending opening in the cylinder member, an annular piston member arranged to be treaded on the rod like carrier adjacent to the end face of the cylinder member and comprising a portion sealingly extending into the cylinder chamber to prevent escape of hydraulic fluid, and control means for varying the volume of the cylinder chamber so as to move one of the members axially and away from the other member when the volume of the cylinder chamber is reduced. The control means may comprise a plunger which is movably mounted in the opening and actuating means for moving or for facilitating movement of the plunger with reference to the cylinder member.

The novel features which are considered as characteristic of the invention are set forth in particular in the appended claims. The improved adapter itself, however, both as to its construction and its mode of operation, together with additional features and advantages thereof, will be best understood upon perusal of the following detailed description of certain specific embodiments with reference to the accompanying drawings, in which FIG. 1 is an axial section through the dividing head of a milling machine wherein four ring-shaped components are held against axial movement by an expansible adapter which embodies one form of my invention; and FIG. 2 is a transverse section as seen in the direction of arrows from the line 2—2 of FIG. 1.

Referring to the drawings, there is shown an expansible adapter 30 which serves to eliminate axial play of several ring-shaped components which are treaded on a rod like carrier here shown as an elongated arbor 11 mounted in the dividing head of a milling machine for peripheral milling. The dividing head includes two spaced supports 12, 13 the latter of which accommodates a rotary spindle 13a serving to drive the arbor 11. This arbor comprises an externally threaded end portion 11a which meshes with a nut 14, and an annular flange 11b which is adjacent to the spindle 13a. The nut 14 and the flange 11b constitute two fixed stops which are disposed at the opposite axial ends of an assembly of ring-shaped components including a milling cutter 15 having a straight hole 15a and held against rotation by a key 28 extending into an axial keyway 11c provided in the periphery of the arbor 11, a first spacer 16 disposed between the milling cutter 15 and the flange 11b, a second spacer 17, which is adjacent to the left-hand end face of the milling cutter 15, and a third spacer 19 which abuts against the nut 14 and which is rotatably received in a sleeve bearing 12a of the support 12. The adapter 30 which is constructed in accordance with the present invention serves to eliminate axial play between the fixed stops 11b, 14 on the one hand and the ring-shaped components 15, 16, 17, 19 on the other hand. It will be noted that the axial length of the spacer 19 is preferably selected in such a way that the adapter 30 need not come in abutment with the support 12 and that the nut 14 is also out of contact with this support. The support 13 accommodates a driving arrangement which serves to rotate the spindle 13a and arbor 11 when the machine is in use.

The adapter 30 comprises a specially constructed cylinder member 18 and a piston member 27. The cylinder member 18 includes a smaller-diameter hub 18b and a larger-diameter collar 18a with the latter more distant from the piston member 27. The right-hand end face 18b' of the hub 18b is provided with an annular cylinder chamber 18e which accommodates a supply of substantially incompressible hydraulic fluid, e.g., oil, and the piston member 27 (which is adjacent to the end face 18b') comprises an annular portion 25 which is sealingly received in the open end of the chamber 18e so as to prevent escape of hydraulic fluid. The inner end face of the annular portion 25 carries an annular sealing element 26.

The cylinder chamber 18e comprises three axial extensions or ducts 18d which are machined into the collar 18a and which communicate with angular spaced equidistant radial openings here shown as blind bores 18c provided in angularly spaced internally threaded portions of the collar 18a. It can be said that the openings 18c and ducts 18d respectively constitute axially and radially extending zones of the cylinder chamber 18e. The purpose of the openings 18c is to accommodate control devices which serve to vary the volume of the chamber 18e and to thereby move one of the members 18, 27 axially of and away from the other member whereby the fluid entrapped in the cylinder chamber 18e serves as a means for shifting the annular portion 25 of the piston member 27 with reference to the cylinder member 18 or vice versa.

Each radial opening 18c accommodates a radially movable plunger 29 whose inner face carries a disk-shaped sealing element 20. The actuating means which serves to move the plungers 29 in the respective openings 18c comprises three screws 21 which mesh with internal threads provided in adjusting nuts 22 screwed into the internal threaded portions of the collar 18a at the outer ends of the respective openings 18c and held in selected positions of adjustment by radial locking screws 24. The means for transmitting motion from the screws 21 to the respective plungers 29 comprises small balls 23 which extend into centrally located recesses provided in the outer end faces of the plungers. The screws 21 may be made integral with the plungers 29 or, alternatively, the plungers may be integral with the nuts 22 and the screws 21 omitted because the nuts 22 then serve as actuating means to move the plungers with reference to the cylinder member 18.

In the illustrated embodiment, the annular portion 25 is not connected to the remainder of the piston member 27, i.e., this annular portion 25 constitutes a separate and readily exchangeable part which may be replaced by shorter or longer annuli to make sure that the adapter of my invention may be put to use in setups wherein the combined axial length of the components 15, 16, 17, 19 is insufficient to allow for elimination of axial play even if the screws 21 are moved to their inner end positions. Since the annular portion 25 is detachable from the remainder of the piston member 27, I prefer to provide this piston member with a cylindrical skirt 27b which receives a portion of the hub 18b to insure that the members 18, 27 remain in permanent axial alignment with each other. The position of this skirt 27b may be reversed, i.e., it is possible to provide the hub 18b with a coaxial skirt which surrounds a portion of the piston member 27.

The cylinder member 18 is of L-shaped cross section, and it will be noted that the axial hole 18f of this cylinder member is free of threads. In other words, the member 18 is freely slidable on the arbor 11 and will come to a halt only when it abuts against a fixed component. The axial hole 27a of the piston member 27 is also free of threads which means that the adapter 30 can be used on arbors, shafts, spindles and similar rod like carriers which need not be provided with external threads or, and as shown in FIG. 1, on carriers which need not be provided with threads for the specific purpose of meshing with a part of the adapter as is the case in certain conventional types of adapters of which I am aware at this time. Of course, it is possible to provide the members 18, 27 with internal teeth which enter the keyway 11c so as to prevent rotation of the adapter with reference to the arbor 11.

While the adapter of my invention may be provided with a single radial opening 18c, it is normally preferred to provide two, three or even more angularly spaced and preferably equidistant openings in order to insure that at least one of the screws 21 can be reached in all angular positions of the arbor 11. For example, it can happen that the dividing head of FIG. 1 allows an operator to gain access to one side of the adapter 30 whereas the other side of the adapter will be very difficult to reach. If the adapter is provided with more than one screw 21, the operator is not inconvenienced by the fact that one side of the adapter is unaccessible, and the adjustment of the adapter can be effected with little loss in time. It will be readily understood that the screw or screws 21 need not extend exactly radially of the cylinder member 18 even though such mounting is more convenient in milling machines for peripheral milling and in similar machine tools wherein the arbor is held between two spaced supports. If one end of the arbor remains unsupported, the screw or screws 21 may be provided in axially extending openings of the cylinder member 18. Such modifications are so obvious that each thereof will be readily comprehended by men skilled in this art without necessitating additional illustrations. All that counts is to provide suitable means to change the volume of the cylinder chamber 18e without necessitating the provision of internal threads, either in the hole 27a of the piston member 27 or in the hole 18f of the cylinder member 18, as in the case in many heretofore used adapters of this general character.

The outer end of each screw 21 is provided with a noncircular recess to receive the working end of a suitable screwdriver or another tool which is utilized to adjust the axial position of the plungers 29. The nuts 22 may be dispensed with if the corresponding portions of the collar 18a are provided with internal threads which may mesh with the threads of the screws 21. The provision of such nuts is advisable to facilitate rough adjustment of the piston member 27 with reference to the cylinder member 18 so that the screws 21 will merely serve for very accurate adjustments in the volume of the chamber 18e.

It is further to be noted that the diameter of the hole 27a or 18f may exceed the diameter of the arbor 11. For example, and if the diameter of the hole 18f exceeds the diameter of the arbor, the cylinder member 18 may also be utilized on arbors whose diameters are smaller than or equal to the diameter of the hole 18f. All that is necessary is to replace the piston member 27 by a member wherein the diameter of the hole 27a equals the diameter of the arbor. The same is true in reverse. If the maximum stroke of the adapter 30 is too short, the operator will employ one or more additional spacers or, alternatively, at least one of the spacers 16, 17, 19 may be replaced by a spacer of greater axial length.

The operation of my improved adapter will be readily understood.

When the operator notes that some axial play exists between the components which are mounted between the nut 14 and flange 11b, at least one of the screws 21 is rotated in a sense to move the respective plunger 29 nearer to the axis of the arbor 11 whereby the fluid entrapped in the cylinder chamber 18e immediately shifts the annular portion 25 of the piston member 27 in a direction to the right, as viewed in FIG. 1, with attendant elimination of axial play. If desired, the locking screws 24 may subject the nuts 22 to some radial compression to prevent uncontrolled rotation of the screws 21. The adapter 30 may be provided with screws 21 of very small diameter, particularly if the collar 18a carries a large number of such screws so that, should the operator find that some axial play still exists even after one of such screws is moved to its inner end position, he can always adjust one or more additional screws 21 to fully eliminate any unnecessary axial play of ring-shaped components on the arbor 11. The provision of a comparatively large number of screws 21 is advisable for another reason, namely, because the operator is then in a position to adjust the pressure of hydraulic fluid with utmost precision since each screw 21 will produce only small changes in the volume of the chamber 18e. As shown in FIG. 1, the diameter of the adapter 30 is comparatively small even though its members may transmit substantial axial pressure such as is necessary to insure satisfactory elimination of axial play in milling machines and similar machine tools.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An expansible adapter, particularly for eliminating axial play of ring-shaped components on a rod like carrier, comprising an annular cylinder member having an axial hole bounded by a surface which is free of threads, an end face provided with an annular chamber arranged to accommodate a supply of hydraulic fluid, a plurality of ducts communicating with said chamber and extending axially of said cylinder member in a direction away from said end face, and a plurality of radially extending openings communicating with said ducts, said cylinder member further comprising threaded portions surrounding said openings; an annular piston member adjacent to said end face, said piston member having an axial hole bounded by a surface which is free of threads and comprising an annular portion sealingly extending into said chamber to prevent escape of hydraulic fluid, said piston member being movable with respect to said cylinder member in response to increasing pressure of fluid in said chamber and control means for increasing the pressure of the fluid in said chamber so as to move one of said members axially of and away from the other member, said control means comprising a plunger reciprocably received in each of said openings and actuating means including screws meshing with said threaded portions and arranged to move the respective plungers with reference to said cylinder member.

2. An expansible adapter, particularly for eliminating axial play of ring-shaped components on a rod-like carrier, comprising an annular cylinder member of substantially L-shaped cross section including a larger-diameter collar and a smaller-diameter hub integral with said collar and having an end face facing away from said collar, said cylinder member having an axial hole bounded by a surface which is free of threads, an annular cylinder chamber provided in the end face of said hub and arranged to accommodate a supply of hydraulic fluid, a plurality of ducts communicating with said chamber and extending axially of said cylinder member in a direction away from said end face, and a plurality of radially extending openings provided in said collar and communicating with said ducts, said collar having threaded portions surrounding said openings; an annular piston member adjacent to said end face, said piston member having an axial hole bounded by a surface which is free of threads and comprising an annular portion sealingly extending into said chamber to prevent escape of hydraulic fluid, said piston member being movable with respect to said cylinder member in response to increasing pressure of fluid in said chamber; and control means for increasing the pressure of the fluid in said chamber so as to move one of said members axially of and away from the other member, said control means comprising a plunger reciprocably received in each of said openings and actuating means including screws meshing with said threaded portions and arranged to move the respective plungers with reference to said cylinder member.

3. An expansible adapter, particularly for eliminating axial play of ring-shaped components on a rod-like carrier, comprising an annular cylinder member of substantially L-shaped cross section including a larger-diameter collar and a smaller-diameter hub integral with said collar and having an end face facing away from said collar, said cylinder member having an axial hole bounded by a surface which is free of threads, an annular cylinder chamber provided in the end face of said hub and arranged to accommodate a supply of hydraulic fluid, a plurality of equidistant ducts communicating with said chamber and extending axially of said cylinder member in a direction away from said end face, and a plurality of equidistant radially extending openings provided in said collar and communicating with said ducts, said collar having threaded portions surrounding said openings; an annular piston member adjacent to said end face, said piston member having an axial hole bounded by a surface which is free of threads and comprising an annular portion sealingly extending into said chamber to prevent escape of hydraulic fluid, said piston member being movable with respect to said cylinder member in response to increasing pressure of fluid in said chamber; and control means for increasing the pressure of the fluid in said chamber so as to move one of said members axially of and away from the other member, said control means comprising a plunger reciprocably received in each of said openings and actuating means including screws meshing with said threaded portions and arranged to move the respective plungers with reference to said cylinder member.

4. An expansible adapter, particularly for eliminating axial play of ring-shaped components on a rod-like carrier, comprising an annular cylinder member of substantially L-shaped cross section including a larger-diameter collar and a smaller-diameter hub integral with said collar and having an end face facing away from said collar, said cylinder member having an axial hole bounded by a surface which is free of threads, an annular cylinder chamber provided in the end face of said hub and arranged to accommodate a supply of hydraulic fluid, a plurality of ducts communicating with said chamber and extending axially of said cylinder member in a direction away from said end face, and a plurality of radially extending openings provided in said collar and communicating with said ducts, said collar having threaded portions surrounding said openings; an annular piston member adjacent to said end face, said piston member having an axial hole bounded by a surface which is free of threads and comprising an annular portion sealingly extending into said chamber to prevent escape of hydraulic fluid, said piston member being movable with respect to said cylinder member in response to increasing pressure of fluid in said chamber; and control means for increasing the pressure of the fluid in said chamber so as to move one of said members axially of and away from the other member, said control means comprising a plunger reciprocably received in each of said openings, a nut screwed into each of said threaded portions, and a screw meshing with each of said nuts and arranged to move the respective plunger radially of said collar.

5. An adapter as set forth in claim 4, further comprising means for locking said nuts to the respective threaded portions.

6. An adapter as set forth in claim 4, wherein said piston member comprises two separable parts one of which constitutes said annular portion.

7. An expansible adapter, particularly for eliminating axial play of ring-shaped components on a rod-like carrier, comprising an annular cylinder member of substantially L-shaped cross section including a larger-diameter collar and a smaller-diameter hub integral with said collar and having an end face facing away from said collar, said cylinder member having an axial hole bounded by a surface which is free of threads, an annular cylinder chamber provided in the end face of said hub and arranged to accommodate a supply of hydraulic fluid, a duct communicating with said chamber and extending axially of said cylinder member in a direction away from said end face, and a radially extending opening provided in said collar and communicating with said duct, said collar having a threaded portion surrounding said opening; an annular piston member adjacent to said end face, said piston member having an axial hole bounded by a surface which is free of threads and comprising an annular portion sealingly extending into said chamber to prevent escape of hydraulic fluid, said piston member being movable with respect to said cylinder member in response to increasing pressure of fluid in said chamber; and control means for increasing the pressure of the fluid in said chamber so as to move one of said members axially of and away from the other member, said control means comprising a plunger reciprocably received in said opening and actuating means including a screw meshing with said threaded portion and arranged to move said plunger with reference to said cylinder member, one of said members comprising a cylindrical skirt surrounding a portion of the other member.

8. An expansible adapter, particularly for eliminating axial play of ring-shaped components on a rod-like carrier, comprising an annular cylinder member of substantially L-shaped cross section including a larger-diameter collar and a smaller-diameter hub integral with said collar and having an end face facing away from said collar, said cylinder member having an axial hole bounded by a surface which is free of threads, an annular cylinder chamber provided in the end face of said hub and arranged to accommodate a supply of hydraulic fluid, a duct communicating with said chamber and extending axially of said cylinder member in a direction away from said end face, and a radially extending opening provided in said collar and communicating with said duct, said collar having a threaded portion surrounding said opening; an annular piston member adjacent to said end face, said piston member having an axial hole bounded by a surface which is free of threads and comprising an annular portion sealingly extending into said chamber to prevent escape of hydraulic fluid, said piston member being movable with respect to said cylinder member in response to increasing pressure of fluid in said chamber; and control means for increasing the pressure of the fluid in said chamber so as to move one of said members axially of and away from the other member, said control means comprising a plunger reciprocably received in said opening and actuating means including a screw meshing with said threaded portion and arranged to move said plunger with reference to said cylinder member, said piston member being provided with a skirt which surrounds the hub of said cylinder member.

9. Expansible adapter comprising, in combination, a substantially annular body having a cylindrical hole adapted to receive a rotatable cylindrical shaft, said substantially annular body having two end faces transversal to said cylindrical hole and an annular peripheral surface between said end faces; a fluid-filled chamber arranged in said body spaced from said cylindrical hole and having a first opening in one of said end faces and a second opening in said peripheral surface; a piston received in said fluid-filled chamber protruding through said first opening and slidable therein substantially in axial direction of said cylindrical hole and sealing said first opening so as to prevent leakage of fluid from said fluid-filled chamber through said first opening; and a plunger mounted in said second opening in said peripheral surface of said annular body adjustably movable into and out of said fluid-filled chamber in direction transverse to the direction of the axis of said shaft so as to displace to different extents during such adjustable movement the fluid in said fluid-filled chamber and thereby to displace to different extents said piston in said fluid-filled chamber and the extent of protrusion thereof from said first opening in axial direction of said cylindrical hole, thereby adjusting the total width of said adapter.

10. Expansible adapter according to claim 9, wherein said first opening in said end face is of annular shape and said piston received in said fluid-filled chamber and protruding through said first opening is also annular shaped.

11. Expansible adapter according to claim 9, wherein a plurality of circumferentially spaced second openings are provided in said peripheral surface and wherein a plurality of plungers are provided each mounted in one of said second openings.

12. Expansible adapter according to claim 9, wherein said fluid-filled chamber is of annular shape surrounding said cylindrical hole in said substantially annular body.

13. Expansible adapter according to claim 9, wherein said second opening in said peripheral surface is screw threaded and wherein said plunger is also screw threaded and located in said second opening screwable to different extents into the same.

References Cited by the Examiner
UNITED STATES PATENTS

| | | | |
|---|---|---|---|
| 2,571,265 | 10/1951 | Leufven | 85—32 |
| 2,812,684 | 11/1957 | Schrem | 85—32 |
| 2,885,919 | 5/1959 | Carlson | 85—32 |

WILLIAM W. DYER, Jr., *Primary Examiner.*

G. A. DOST, *Assistant Examiner.*